E. F. LOCKWOOD.
MULTIPLE PAN CONSTRUCTION.
APPLICATION FILED AUG. 14, 1914.
1,149,928. Patented Aug. 10, 1915.
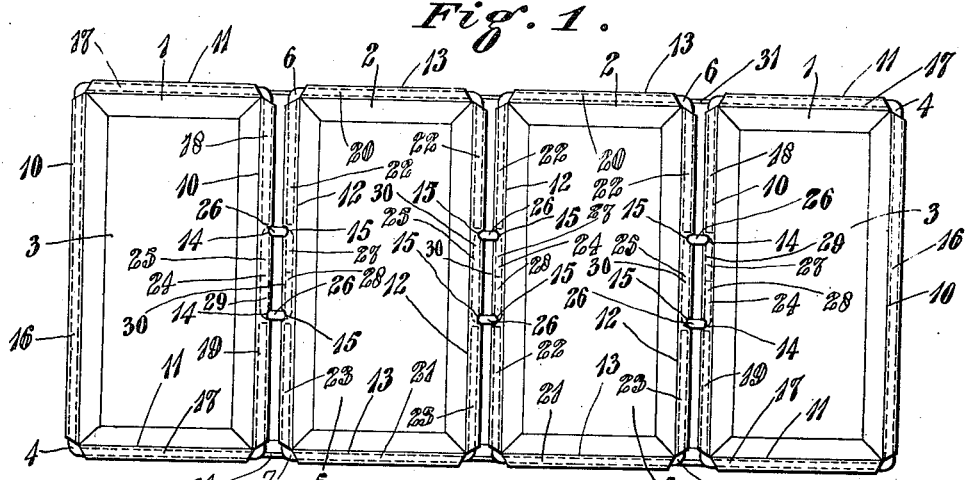
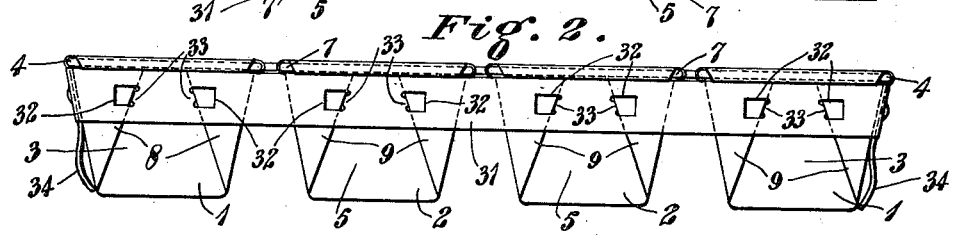
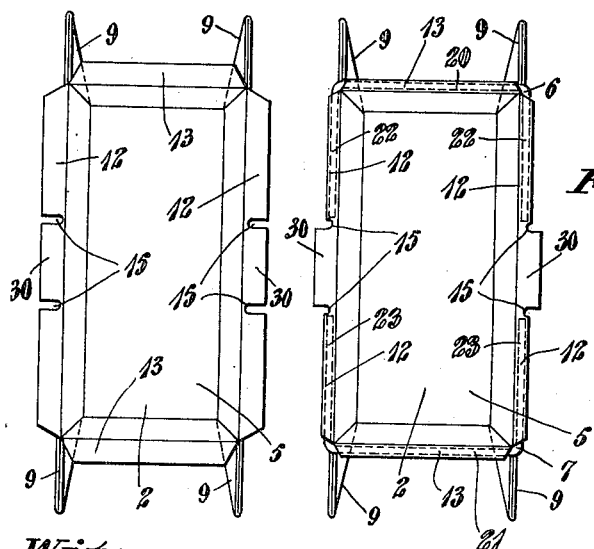
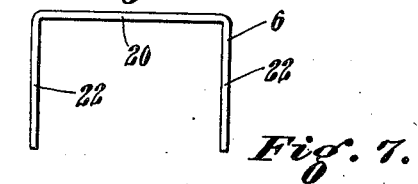
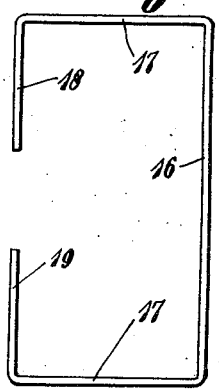
Witnesses:
Clarence Perdew
Catherine Doran
Inventor
Edwin F. Lockwood
By James N. Ramsey
Attorney

UNITED STATES PATENT OFFICE.

EDWIN F. LOCKWOOD, OF BELLEVUE, KENTUCKY, ASSIGNOR TO LOCKWOOD MANUFACTURING COMPANY, OF CINCINNATI, OHIO, A FIRM COMPOSED OF EDWIN F. LOCKWOOD AND HARRY A. LOCKWOOD.

MULTIPLE-PAN CONSTRUCTION.

1,149,928.

Specification of Letters Patent. Patented Aug. 10, 1915.

Application filed August 14, 1914. Serial No. 856,870.

*To all whom it may concern:*

Be it known that I, EDWIN F. LOCKWOOD, a citizen of the United States, residing at Bellevue, in the county of Campbell and State of Kentucky, have invented certain new and useful Improvements in Multiple-Pan Construction, of which the following is a specification.

My invention relates to the construction of pans or like receptacles where a plurality of them are attached together, and it is especially applicable to baking pans for use in bakeries, where the pans of a set must be securely joined together and prevented from being distorted through the action of the heat or by mechanical impact upon them, but wherein the pans must be spaced apart so that a free circulation of the heated air up between them will be permitted.

The object of my invention is to provide such pans, simply constructed, and without the use of rivets or other projections inside the pans, so as not to be unsanitary and not to affect the shape and appearance of the loaves of bread or other articles baked in the pans.

My invention consists in the parts and in the details of construction and arrangement of parts as will be hereinafter more fully described and claimed.

In the drawing: Figure 1 is a plan view of a set of pans constructed according to my invention; Fig. 2 is an end elevation of the same; Fig. 3 is a detail of one of the middle pans of the set before it is completely formed; Fig. 4 is a similar view of the pan after the end wires have been fastened in the pan; Fig. 5 is a detail of one of the links; Fig. 6 is a detail of one of the end wires of a middle pan; and Fig. 7 is a detail of the wire of one of the end pans of the set.

The set of pans here shown consists of the end pans 1 and two middle pans 2, although it will be understood that any reasonable number of middle pans may be included in the set.

The end pan 1 comprises the body 3 and the wire 4 extending around in its rim; and each of the middle pans 2 similarly comprises the body 5 with wires 6 and 7 in its rim. Each of the bodies 3 or 5 of the end or middle pans preferably consists of one piece of sheet metal, usually tin plate, formed up so as to have a rectangular bottom and upwardly flaring sides and ends, the superfluous parts of the sheet at the corners being disposed of in folds 8 or 9, as the case may be, and the rims having side flanges 10 and end flanges 11 on the end pans, and side flanges 12 and end flanges 13 on the middle pans, which are first formed substantially horizontal and afterward bent down around the wires 4 on the end pans, or the wires 6 and 7 on the middle pans, in a manner somewhat similar to the usual wiring of the rims of sheet metal vessels.

The bodies 3 and 5 of the end and middle pans are alike except that only the inside rim flange 11 of each end pan is provided with two slits 14 near the middle, whereas both of the side rim flanges 12 of the middle pans have slits 15 near the middle. These slits 14 or 15, as the case may be, are cut transversely in the flanges while the flanges extend substantially horizontally prior to forming the flanges down over the wires, as is shown in Fig. 3.

The wire 4 of the end pan 1 has one complete side 16 and complete ends 17 at right angles thereto, but, to extend on the other side of the pan parallel to the side 16, there are short parts 18 and 19 extending toward each other from the ends 17, and coming substantially in alinement so that they may occupy the rim of the pan at that side and terminate slightly short of the slits 14 in the rim, leaving an empty space in the rim at and between the slits.

The two end wires 6 and 7 of the middle pan 2 are alike in formation in comprising complete end parts 20 and 21, respectively, and short side parts 22 and 23, respectively, the side parts 22 and 23 corresponding in length and arrangement to the parts 18 and 19 of the wires 4 in the end pans. Thus each middle pan will have its wires 22 and 23 terminating slightly short of the slits 15 in its rim, with empty spaces left at and between the slits at each side of the pan.

The link 24 is of substantially rectangular formation with a continuous side 25 and short ends 26 substantially at right angles thereto, and an opposite side formed of parts 27 and 28 meeting near the middle thereof, as best seen in Fig. 5. This link is of such length that its short ends 26 are spaced apart the entire distance to extend through the slits 14 or 15 in the rim of the pan 1 or 2, as the case may be, with the sides of the link lying in the empty spaces between the slits. With the link in such position, the middle parts 29 or 30 of the side rims of the end pans 1 or middle pans 2 are turned down around the sides of the links, completing the rims. It will be seen that such assemblage may be duplicated to any reasonable extent, and with the rims thus fully formed by bending the middle parts 29 and 30 around the sides of the links 24, each two adjacent pans will be firmly connected by the links, with the short end parts 26 extending parallel from one pan to the other near the middle of the side of each pan. Thus the pans are firmly joined and spaced apart in the middle regions of their side rims, and at the same time have their rims wired neatly and with practically no more irregularity than is found in ordinary pans with wired rims.

To form the main support for holding all of the pans of the set together I prefer to provide side rails 31, best seen in Fig. 2, having slots 32 with tongues 33, said tongues entering under the folds 8 and 9 at the ends of the pans when the pans are completely formed. At the ends of the set, these rails 30 also support shock absorbers 34 that protect the sides of the end pans against distortion from mechanical impact, but which, not forming part of this invention, need not be more particularly described.

The attachment of the supporting side rails 30 by means of the tongues 33 eliminates riveting from the ends of the pans, and my improved construction in the rims for joining and spacing the middle parts of the sides of the pans, eliminates riveting at the sides of the pans. Rivets are highly objectionable in baking pans, not only because they render the insides of the pans difficult to keep clean, especially after the pans have been used for some time and the rivets have inevitably become somewhat loose under the action of the heat and the mechanical impact.

While thus confining the joining and spacing means to the rims of the pans, the wires running between the pans are amply strong to resist not only tension but compression, and thus prevent either inward or outward warping of the sides of the pans. If the sides warp either inwardly or outwardly, the pans produce a distorted baked article, and furthermore, if they are warped outward, the sides of the adjacent pans will come very close together and close the space therebetween against the free circulation of the heated air up between the pans, as is necessary to secure the best results in baking. While thus being amply strong for the purpose, the wires are of little bulk, and thus themselves form very little obstruction to this circulation of air.

Having fully described my invention, what I claim as new and desire to secure by Letters Patent is:

1. In multiple pan construction, a plurality of pans having rims, the rim of each pan having spaced apart openings, and a wire link having one side lying within the rim of one pan from one of said spaced apart openings to the other, and having another side lying within the rim of another pan from one of the spaced apart openings therein to the other, and parts to said link joined to the sides thereof and extending through the respective openings in the rims, from one pan to the other, to join the pans together and space them apart.

2. In multiple pan construction, a plurality of pans having straight sides adjacent to each other, each of said sides having near its middle two openings spaced apart, and a substantially rectangular wire link having one side lying within the side of one pan from one of the openings therein to the other, and having another side lying within the side of the other pan from one of the spaced-apart openings therein to the other, and end parts to said link joined to the sides thereof and extending from one pan to the other to join the pans together and space them apart.

3. In multiple pan construction, a plurality of pans having elongated substantially straight adjacent sides, required to be spaced apart but to have their middle parts braced with respect to each other, and a wire extending from one of said middle parts to the other to join these parts together and space them apart.

EDWIN F. LOCKWOOD.

Witnesses:
 JAMES N. RAMSEY,
 CLARENCE PERDEW.